US007546422B2

(12) United States Patent
George et al.

(10) Patent No.: US 7,546,422 B2
(45) Date of Patent: Jun. 9, 2009

(54) METHOD AND APPARATUS FOR THE SYNCHRONIZATION OF DISTRIBUTED CACHES

(75) Inventors: Robert T George, Austin, TX (US); Mathew A Lambert, Olympia, WA (US); Tony S Rand, Tacoma, WA (US); Robert G Blankenship, Tacoma, WA (US); Kenneth C Creta, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 514 days.

(21) Appl. No.: 10/231,414

(22) Filed: Aug. 28, 2002

(65) Prior Publication Data

US 2004/0044850 A1 Mar. 4, 2004

(51) Int. Cl.
*G06F 12/08* (2006.01)
(52) U.S. Cl. ................... 711/145; 711/146; 711/141; 711/129
(58) Field of Classification Search ......... 711/144–146, 711/155–156, 154, 128, 129, 141; 710/36, 710/28
See application file for complete search history.

(56) References Cited

U.S. PATENT DOCUMENTS

| 5,813,034 | A  | * | 9/1998  | Castle et al.      | 711/146 |
| 6,052,760 | A  | * | 4/2000  | Bauman et al.      | 711/119 |
| 6,223,260 | B1 | * | 4/2001  | Gujral et al.      | 711/145 |
| 6,374,332 | B1 | * | 4/2002  | Mackenthun et al.  | 711/145 |
| 6,415,634 | B2 | * | 7/2002  | Luquire            | 70/18   |
| 6,434,641 | B1 | * | 8/2002  | Haupt et al.       | 711/150 |
| 6,473,849 | B1 | * | 10/2002 | Keller et al.      | 712/30  |
| 6,480,927 | B1 | * | 11/2002 | Bauman             | 711/154 |
| 6,560,681 | B1 | * | 5/2003  | Wilson et al.      | 711/144 |
| 6,636,926 | B2 | * | 10/2003 | Yasuda et al.      | 711/141 |
| 6,789,173 | B1 | * | 9/2004  | Tanaka et al.      | 711/147 |
| 6,848,023 | B2 | * | 1/2005  | Teramoto           | 711/141 |
| 2002/0099833 | A1 | * | 7/2002 | Steely et al.      | 711/141 |

* cited by examiner

*Primary Examiner*—Pierre-Michel Bataille
(74) *Attorney, Agent, or Firm*—Kenyon & Kenyon LLP (57) ABSTRACT

A method and apparatus for the synchronization of distributed caches. More particularly, the present invention to cache memory systems and more particularly to a hierarchical caching protocol suitable for use with distributed caches, including use within a caching input/output (I/O) hub.

16 Claims, 8 Drawing Sheets

METHOD AND APPARATUS FOR THE SYNCHRONIZATION OF DISTRIBUTED CACHES

BACKGROUND OF THE INVENTION

The present invention relates to cache memory systems and more particularly to a hierarchical caching protocol suitable for use with distributed caches (e.g., in Very Large-Scale Integration (VLSI) devices), and may be utilized within a caching input/output (I/O) hub.

As is known in the art, the system cache in a computer system serves to enhance the system performance of modern computers. For example, a cache can maintain data between a processor and relatively slower system memory by holding recently accessed memory locations in case they are needed again. The presence of cache allows the processor to continuously perform operations utilizing the data in the faster-accessing cache.

Architecturally, system cache is designed as a "monolithic" unit. In order to give a processor core simultaneous read and write access from multiple pipelines, multiple ports can be added to the monolithic cache device for external I/O devices. However, there are several detrimental architectural and implementation impacts of using a monolithic cache device with several read/write ports (for example, in a dual-ported monolithic cache). Current monolithic cache devices are not optimized for multiple ports and not the most efficient implementation available.

Computer systems are designed to accommodate a single or multiple central processing units (CPUs), coupled via a common system bus or switch to a memory and a number of external input/output devices. The purpose of providing multiple central processing units is to increase the performance of operations by sharing tasks between the processors. Such an arrangement allows the computer to simultaneously support a number of different applications while supporting I/O components that are, for example, communicating over a network and displaying images on attached display devices. Multiprocessor computer systems are typically utilized for enterprise and network server systems.

To enhance performance, all of the devices coupled to the bus must communicate efficiently. Idle cycles on the system bus represent time periods in which an application is not being supported, and therefore represent reduced performance.

A number of situations arise in multi-processor computer system designs in which the bus, although not idle, is not being used efficiently by the processors coupled to the bus. Some of these situations arise due to the differing nature of the devices that are coupled to the bus. For example, processors typically include cache logic for temporary storage of data from the memory. A coherency protocol is implemented to ensure that each central processor unit only retrieves the most up to date version of data from the cache. MESI (Modified-Exclusive-Shared-Invalid) coherency protocol data can be added to cached data in order to arbitrate and synchronize multiple copies of the same data within various caches. Therefore, processors are commonly referred to as "cacheable" devices.

However, I/O components, such as those coupled to a Peripheral Component Interconnect (PCI) ("PCI Local Bus Specification", version 2.1, Jun. 1, 1995, from the PCI Special Interest Group (PCI-SIG)) bus, are generally non-cacheable devices. That is, they typically do not implement the same cache coherency protocol that is used by the processors. Typically, I/O components retrieve data from memory, or a cacheable device, via a Direct Memory Access (DMA) operation. Accordingly, measures must be taken to ensure that I/O components only retrieve valid data for their operations. An I/O device may be provided as a connection point between various I/O bridge components, to which I/O components are attached, and ultimately, to the processor.

An input/output (I/O) device may be utilized as a caching I/O device. That is, the I/O device includes a single, monolithic caching resource for data. Therefore, because an I/O device is typically coupled to several client ports, a monolithic I/O cache device will suffer the same detrimental architectural and performance impacts as previously discussed. Current I/O cache device designs are not efficient implementations for high performance systems.

Implementing multiple cache systems for processors and I/O devices requires cache coherency amongst the caches. Cache coherency is the synchronization of data in a plurality of caches such that reading a memory location via any cache will return the most recent data written to that location via any other cache. Current solutions for synchronizing multiple cache systems include utilizing the MESI coherency protocol and having each cache broadcast its request to every other cache in the system and then wait for a response from those devices. This approach has the inherent problem of being non-scalable. As additional cache devices are added as needed to a multiple cache system, latency throughout the system is increased dramatically, thereby decreasing overall system performance. Multiple cache systems become impractical to implement, and therefore, a need exists for a scalable method of improving the efficiency and latency performance of distributed caches. Furthermore, a need exists for an improved coherency protocol to improve the performance of synchronization of increased data bandwidth inherent in a distributed cache system.

In view of the above, there is a need for a method and apparatus for synchronizing distributed caches in VLSI device, namely, high performance I/O systems.

DETAILED DESCRIPTION OF THE DRAWINGS

Figure 1:
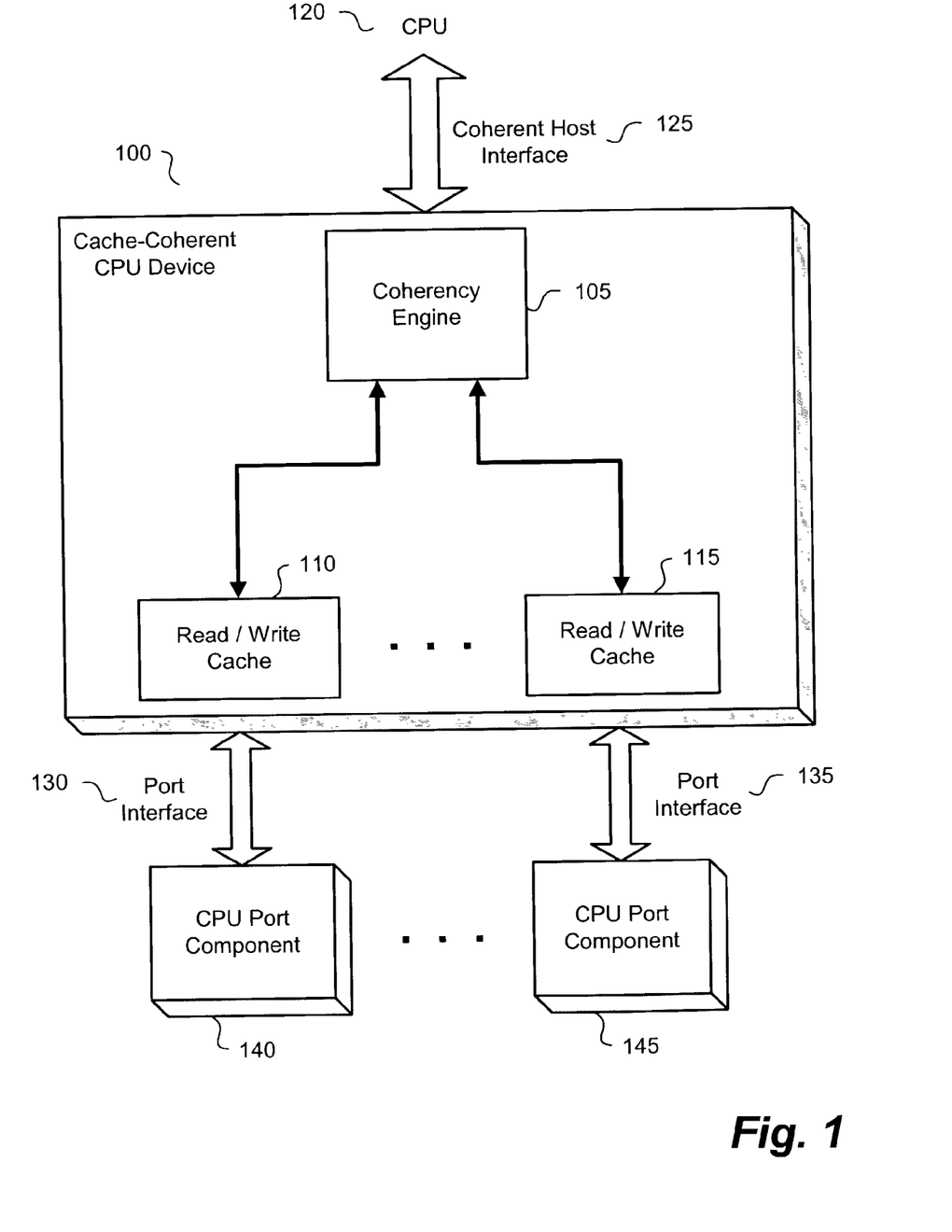
FIG. 1 is a block diagram of a portion of a processor cache system employing an embodiment of the present invention.

Referring to FIG. 1, a block diagram of a processor cache system employing an embodiment of the present invention is shown. In this embodiment, processor 120 requests data from cache-coherent CPU device 100. The cache-coherent CPU device 100 implements coherency by arbitrating and synchronizing the data within the distributed caches 110 and 115. CPU port components 140 and 145 may include, for example, system RAM, or I/O Components. However, any suitable component for the CPU ports may be utilized as port components 140 and 145. In this example, cache-coherent CPU device 100 is part of a chipset that provides a PCI bus to interface with I/O components (described below) and interfaces with system memory and the CPU.

The cache-coherent CPU device 100 includes a coherency engine 105 and one or more read and write caches 110 and 115. In this embodiment of the cache-coherent CPU device 100, coherency engine 105 contains a reference table, indexing the data within distributed caches 110 and 115. The coherency engine 105 may utilize, for example, the Modified-Exclusive-Shared-Invalid (MESI) coherency protocol, labeling the data with line state MESI tags: 'M'-state (modified), 'E'-state (exclusive), 'S'-state (shared), or 'I'-state (invalid). In addition, coherency engine 105 may also utilize other coherency protocols, including but not limited to, an improved MESI protocol with intermediate coherency states described further in this application. Each new request from the cache of any of the processor port components 140 and 145 is checked against the table of coherency engine 105. If the request does not interfere with any data found within any of the other caches, the transaction is processed. Utilizing MESI tags enables coherency engine 105 to quickly arbitrate between caches reading from and writing to the same data, meanwhile, keeping all data synchronized and tracked between all caches.

Rather than employing a single monolithic cache, cache-coherent processor device 100 physically partitions the caching resources into smaller, more implementable portions, each connected to coherency engine 105. Caches 110 and 115 are distributed across all ports on the device, such that each cache is associated with a port component. According to an embodiment of the present invention, cache 110 is physically located on the device nearby port component 140 being serviced. Similarly, cache 115 is located proximately to port component 145, thereby reducing the latency of transaction data requests. This approach minimizes the latency for "cache hits" and performance is increased. A cache hit is a request to read from memory that may be satisfied from the cache without using main (or another) memory. Reducing transaction latency is a major benefit of a distributed cache mechanism. This allows the cache coherent device 100 to supply coherent responses to port component devices 140 and 145 without traversing the distance across these devices. However, device 100 must be kept cache coherent with respect to the other coherent devices in the system. This results from host CPU 120 and other coherent port components sending remote coherency "snoops" (i.e. a monitoring signal) to determine if the port component maintains MESI state information for a particular coherent line. Since the coherency engine 105 tracks the MESI state of all coherent lines maintained within the device 100, coherency engine 105 can quickly respond to remote snoop requests. Rather than having the remote snoop request traverse the entire system diameter of each port component to query the local caches directly, the remote snoop is serviced quickly, thereby reducing latency.

Distributing caches, according to this embodiment of the present invention, also provides improvements in scalability design. Using a monolithic cache, an increase in the number of ports would make the CPU device geometrically more complex in design (e.g., a four-port CPU device would be sixteen times more complex using a monolithic cache compared to a one-port CPU device). With this embodiment of the present invention, utilizing a coherency engine, the addition of another port is easier to design into the CPU device by adding the appropriate connections to the coherency engine and an additional cache for the new port. Therefore, distributed caches that implement a coherency directory are inherently more scalable.

Furthermore, the distributed cache architecture improves aggregate bandwidth with each port component 140 and 145 capable of utilizing the full transaction bandwidth for each of the read/write caches 110 and 115.

Figure 2:
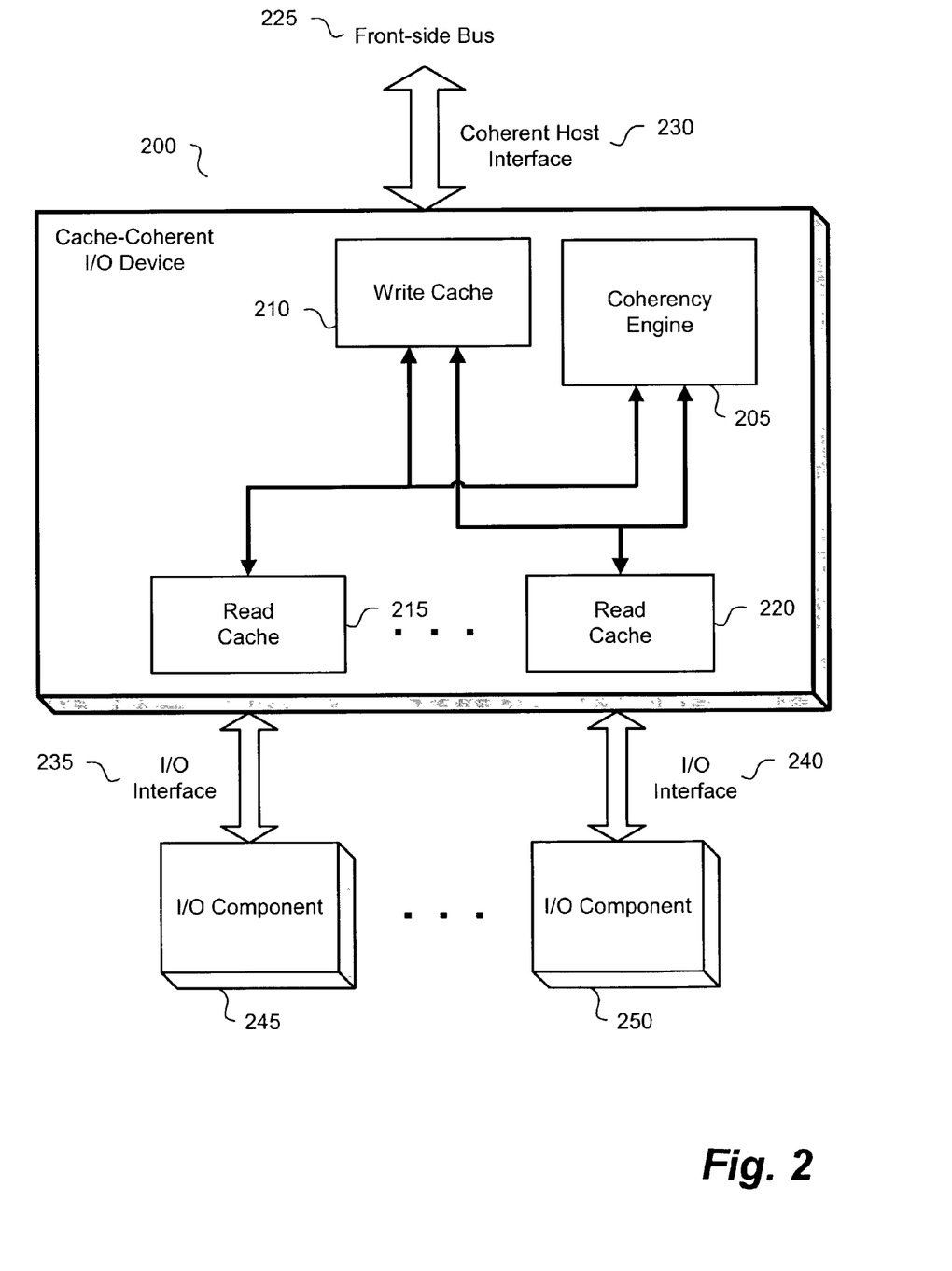
FIG. 2 is a block diagram showing an input/output read and write caching system employing an embodiment of the present invention.

Referring to FIG. 2, a block diagram of an input/output cache device employing an embodiment of the present invention is shown. In this embodiment, cache-coherent I/O device 200 is connected to a coherent host, here, a front-side bus 225. The cache-coherent I/O device 200 implements coherency by arbitrating and synchronizing the data within the distributed caches 210, 215 and 220. A further implementation to improve current systems involves the leveraging of existing transaction buffers to form caches 210, 215 and 220. Buffers are typically present in the internal protocol engines used for external systems and I/O interfaces. These buffers are used to segment and reassemble external transaction requests into sizes that are more suitable to the internal protocol logic. By augmenting these pre-existing buffers with coherency logic and a content addressable memory to track and maintain coherency information, the buffers can be effectively used as MESI coherent caches 210, 215, and 220 implemented within a distributed cache system. I/O components 245 and 250 may include, for example, a disk drive. However, any suitable component or device for the I/O ports may be utilized as I/O components 245 and 250.

According to an embodiment of the present invention, a first read cache 215 may be provided and associated with the first I/O interface 235, and a second read cache 220 may be provided and associated with the second I/O interface 240. That is, for each I/O interface 235, 240, there is a read cache 215, 220 dedicated thereto. This approach minimizes the latency for "cache hits" and performance is increased. This arrangement is particularly useful for data that is prefetched by I/O components 245 and 250. Any suitable configuration of the number of I/O interfaces, I/O components, and read caches may be utilized. The read caches 215 and 220 provides the I/O component 245 and 250 a low latency copy of the "most likely to use" data. The distributed cache architecture also improves aggregate bandwidth with each port component 245 and 250 capable of utilizing the full transaction bandwidth for each read/write cache 210, 215 and 220.

In an embodiment of the present invention, a first read cache 215 may be provided and associated with the first I/O interface 235, and a second read cache 220 may be provided and associated with the second I/O interface 240. According to an embodiment of the present invention, the read caches 215 and 220 maintain cache lines in the shared and invalid states. Although the read caches 215 and 220 are shown as being on a single component (i.e., on the cache-coherent I/O device 200), the read caches may be distributed (and separated) on one or more different components. The write cache 210 manages coherent memory writes initiated by the I/O components 245 and 250. The write cache 210 is also responsible for snooping, or monitoring, through coherent host interface 230 to the front-side bus 225 (or an Intel® Scalability Port) before committing to the memory write. According to an embodiment of the present invention, the write cache 210 follows the Modified-Exclusive-Shared-Invalid (MESI) caching protocol. However, any suitable caching protocol may be utilized.

A coherency engine 205 is provided in the cache-coherent I/O device 200. Coherency engine 205 provides tracking of all of the cache lines in the write cache 210 and the read caches 215 and 220. The coherency engine 205 tracks the line state, as well as a pointer to the structure that stores the tracking data. Tracking the state enables a faster response to requests. Tracking the structures storing the line enables the protocol that is required between the structures.

A local request buffer may be provided with the cache-coherent I/O device 200 to store all inbound coherent and non-coherent transactions. A remote request buffer may also be provided with cache-coherent I/O device 200 to check for conflicts between snoop or invalidate cycles from the coherent host and the inbound requests from cache-coherent I/O device 200 itself.

The cache-coherent I/O device 200 may have a plurality of caching resources, each including a write cache 210, a coherency engine 205, one or more read cache 215 and 220, a local request buffer, and a remote request buffer. Moreover, the cache-coherent I/O device 200 may include a coherency engine 205 interconnecting the read caches 215 and 220 and the write cache 210. The coherency engine 205 is utilized to synchronize the caches within the caching resources.

Effective transaction bandwidth in I/O devices is improved in at least two ways by utilizing a cache-coherent I/O device 200. Cache-coherent I/O device 200 may aggressively prefetch data. If cache-coherent device 200 speculatively requests ownership of data subsequently requested or modified by the processor system, caches 210, 215 and 220 may be "snooped" (i.e. monitored) by the processor, which, in turn, will return the data with the correct coherency state preserved. As a result, cache-coherent device 200 can selectively purge contended coherent data, rather than deleting all prefetched data in a non-coherent system where data is modified in one of the prefetch buffers. Therefore, the cache hit rate is increased, thereby increasing performance.

Cache-coherent I/O device 200 also enables pipelining coherent ownership requests for a series of inbound write transactions destined for coherent memory. This is possible because cache-coherent I/O device 200 provides an internal cache which is maintained coherent with respect to system memory. The write transactions can be issued without blocking the ownership requests as they return. Existing I/O devices must block each inbound write transaction, waiting for the system memory controller to complete the transaction before subsequent write transactions may be issued. Pipelining I/O writes significantly improves the aggregate bandwidth of inbound write transactions to coherent memory space.

As seen from the above, the distributed caches serve to enhance overall cache system performance. The distributed caches system enhances the architecture and implementation of a cache system with multiple ports. Specifically within I/O cache systems, distributed caches conserve the internal buffer resources in I/O devices, thereby improving device size, while improving the latency and bandwidth of I/O devices to memory.

Figure 3:
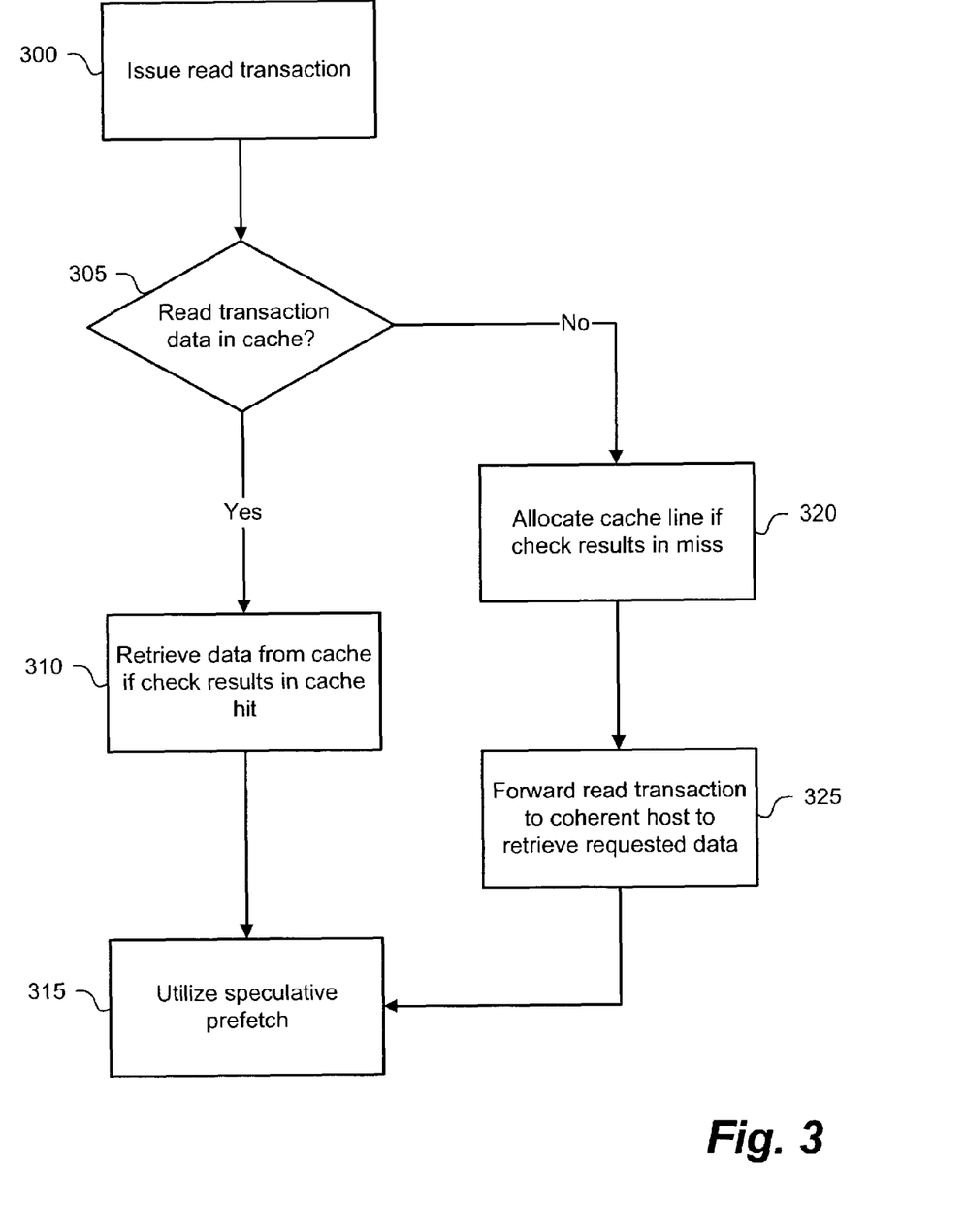
FIG. 3 is a flow diagram showing an inbound coherent read transaction employing an embodiment of the present invention.

Referring to FIG. 3, a flow diagram of an inbound coherent read transaction employing an embodiment of the present invention is shown. An inbound coherent read transaction originates from port component 140 or 145 (or similarly from I/O component 245 or 250). Accordingly, in block 300, a read transaction is issued. Control is passed to decision block 305, where the address for the read transaction is checked within the distributed caches 110 or 115 (or similarly from caches 215 or 220). If the check results in a cache hit, then the data is retrieved from the cache in block 310. Control then passes to block 315 where speculatively prefetched data in the cache can be utilized to increase the effective read bandwidth and reduce the read transaction latency. If the read transaction data is not found in cache from decision block 305, resulting in a miss, a cache line is allocated for the read transaction request in block 320. Control then passes to block 325 where the read transaction is forwarded to the coherent host to retrieve the requested data. In requesting this data, the speculative prefetch mechanism in block 315 can be utilized to increase the cache hit rate by speculatively reading one or more cache lines ahead of the current read request and by maintaining the speculatively read data coherent in the distributed cache.

Figure 4:
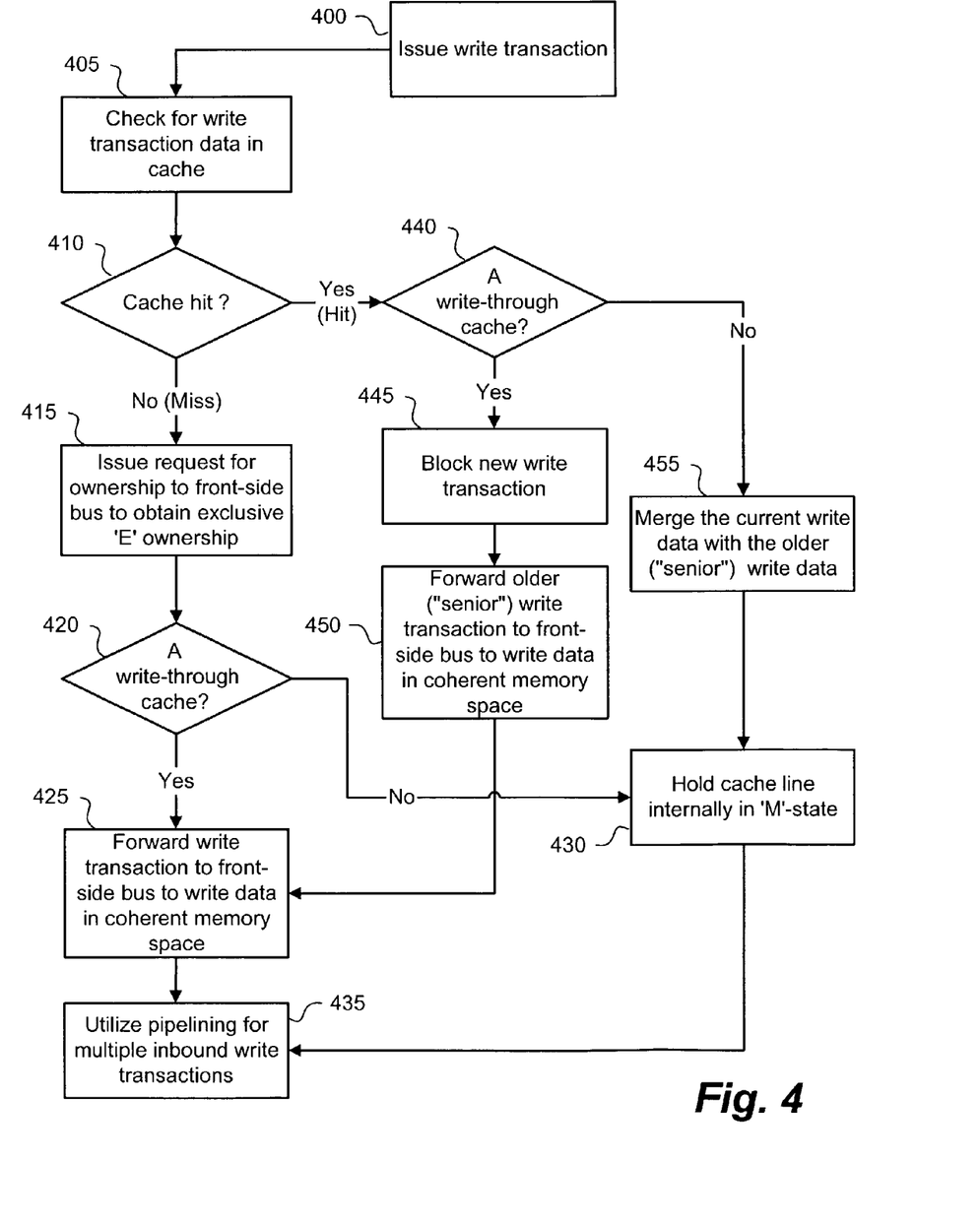
FIG. 4 is a flow diagram showing an inbound coherent write transaction employing an embodiment of the present invention.

Referring to FIG. 4, a flow diagram of one or more inbound coherent write transactions employing an embodiment of the present invention is shown. An inbound coherent write transaction originates from port component 140 or 145 (or similarly from I/O component 245 or 250). Accordingly, in block 400, a write transaction is issued. Control is passed to block 405, where the address for the write transaction is checked within the distributed caches 110 or 115.

In decision block 410, a determination is made whether the check results in a "cache hit" or "cache miss." If the cache-coherent device does not have exclusive 'E' or modified 'M' ownership of the cache line, the check results in a cache miss. Control then passes to block 415, where the coherency engine will forward a "request for ownership" to an external coherency device (e.g. memory) requesting exclusive 'E' ownership of the target cache line. When exclusive ownership is granted to the cache-coherent device, the coherency engine marks the line as 'M'. At this point, in decision block 420, the coherency engine may either forward the write transaction data to the front-side bus to write data in coherent memory space in block 425, or maintain the data locally in the distributed caches in modified 'M'-state in block 430. If the coherency engine always forwards the write data to the front-side bus upon receiving exclusive 'E' ownership of the line, then the cache-coherent device operates as a "write-through" cache, in block 425. If the coherency engine maintains the data locally in the distributed caches in modified 'M'-state, then the cache-coherent device operates as a "write-back" cache, in block 430. In each instance, either forwarding the write transaction data to the front-side bus to write data in coherent memory space in block 425, or maintaining the data locally in the distributed caches in modified 'M'-state in block 430, control then passes to block 435, where the pipelining capability within distributed caches is utilized.

In block 435, the pipelining capability of global system coherency can be utilized to streamline a series of inbound write transactions, thereby improving the aggregate bandwidth of inbound writes to memory. Since global system coherency will be maintained if the write transaction data is promoted to modified 'M'-state in the same order it was received from port component 140 or 145 (or similarly from I/O component 245 or 250), the processing of a stream of multiple write requests may be pipelined. In this mode, the coherency engine will forward a request for ownership to an external coherency device requesting exclusive 'E' ownership of the target cache line as each write request is received from port component 140 or 145 (or similarly from I/O component 245 or 250). When exclusive ownership is granted to the cache-coherent device, the coherency engine marks the line as modified 'M' as soon as all the preceding writes have also been marked as modified 'M'. As a result, a series of inbound writes from port 140 or 145 (or similarly from I/O component 245 or 250) will result in a corresponding series of ownership requests, with the stream of writes being promoted to modified 'M'-state in the proper order for global system coherency.

If a determination is made that the check results in a "cache hit" in decision block 410, control then passes to decision block 440. If the cache-coherent device already has exclusive 'E' or modified 'M' ownership of the cache line in one of the other distributed caches, the check results in a cache hit. At this point, in decision block 440, the coherency engine will manage the coherency conflict either as a write-through cache, passing control to block 445, or, as a write-back cache, passing control to block 455. If the coherency engine always blocks the new write transaction until the senior write data can be forwarded to the front-side bus upon receiving a subsequent write to the same line, then the cache-coherent device operates as a write-through cache. If the coherency engine always merges the data from both writes locally in the distributed caches in modified 'M'-state, then the cache-coherent device operates as a write-back cache. As a write-through cache, the new write transaction is blocked in block 445, until the older ("senior") write transaction data can be forwarded to the front-side bus to write data in coherent memory space in block 450. After the senior write transactions have been forwarded, other write transactions can then be forwarded to the front-side bus to write data in coherent memory space in block 425. Control then passes to block 435, where the pipelining capability of distributed caches is utilized. As a write-back cache in block 455, the data from both writes is merged locally in the distributed caches in modified 'M'-state, and held internally in modified 'M'-state in block 430. Again, control passes to block 435, where multiple inbound write transactions may be pipelined, as described above.

Figure 5:
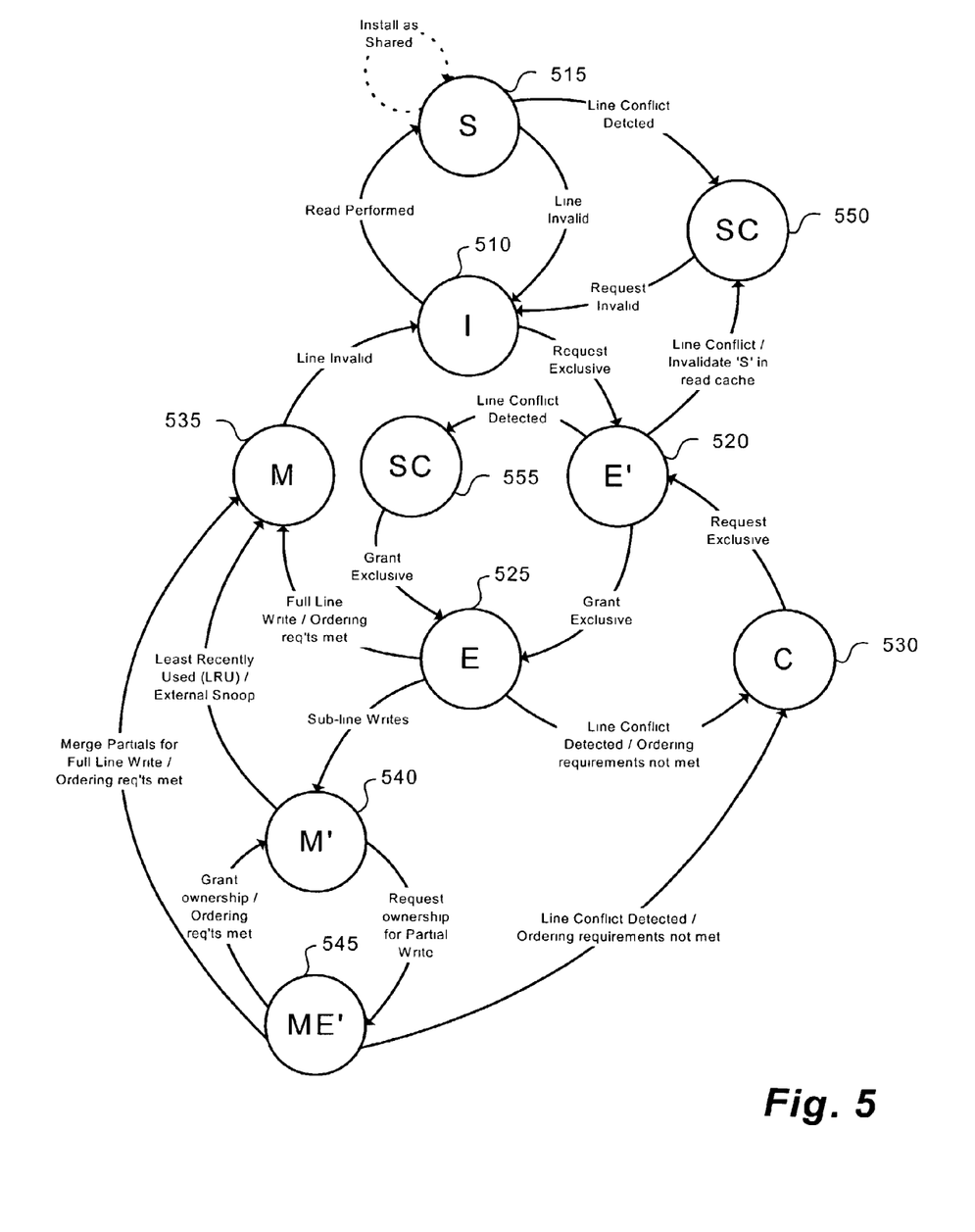
FIG. 5 is a state machine diagram showing a coherency protocol employing an embodiment of the present invention.

Referring to FIG. 5, a state machine diagram showing a coherency protocol employing an embodiment of the present invention is shown. The state machine diagram illustrates the system utilizing the MESI coherency protocol and intermediate states described herein.

In state 510, a data line is in 'I'-state, where both reads and writes typically begin. However, the coherency engine does not have state information for transactions in this state. If the data line is not already present in the cache when a read transaction is issued, the data line is allocated to the cache. The data can then be retrieved from a processor or bus read. After the read transaction is completed, the coherency engine recognizes the data line as 'S'-state in 515. Once the line is purged or written to the bus, the line is invalid and returned to 'I'-state in 510. However, when in 'S'-state, if a snoop detects a line conflict, the coherency engine changes the data line to shared-conflict state as 'SC'-state in 550 to invalidate the line.

When a write transaction is issued, the line starts as 'I'-state in 510. The line is requested as exclusive, and then is immediately changed 'E-prime' state in 520 awaiting acknowledgement from the coherency engine to promote the line to exclusive 'E'-state in 525. A request for ownership is issued from the internal ordering queues, but the data line remains in 'E-prime' state in 520 until a positive completion for exclusive ownership is received from the coherency engine. If a snoop detects a line in the cache as 'S'-state, the data line must be invalidated and moves to 'SC'-state in 550. The line is invalidated and returned to 'I'-state in 510. Or, if a line conflict is detected in the request for exclusive ownership, the line transitions to 'SC' state in 555 and waits for the conflict to be resolved. After the inbound request for ownership is granted, a snoop responds by moving the line to exclusive 'E'-state in 525.

In 'E-prime' state in 520, when the request for ownership is completed, the line moves to 'E'-state in 525. If a conflict is detected for exclusive access to the line, the line changes to conflict 'C'-state in 530. A line moves to 'C'-state as a result of either when a snoop detects a line conflict for exclusive 'E'-state ownership or when the ordering requirements for a line write have not been met. When the conflict is resolved, the line returns to 'E-prime' in 520 awaiting acknowledgment to exclusive access to the line in 'E'-state in 525.

From 'E'-state, the line can be modified by writing either a full line writes or a sub-line writes in the form of partial writes to the line. A full line write command completes a processor write and changes the line state to 'M'-state in 535. This occurs as a result of meeting the ordering requirements for a full line write. The line write to memory is performed and the write transaction is completed. If the data line needs to be written to again, a purge of the cached copy or write to the bus occurs, invalidating the line, and returning the line to 'I'-state in 510 at the end of the write transaction cycle shown. A sub-line write command includes states 540 and 545, 'M-prime' state and modified-exclusive 'ME-prime' state, respectively. When the ordering requirements for a sub-line write are met, the line is promoted to 'M-prime' state in 540. In this state, the line resides in the write cache, available for subsequent partial writes to merge into it. Two mechanisms can move the data line from 'M-prime' state in 540 to 'M'-state in 535, where the data line is written to memory. Either, an external snoop detects a line conflict in the write cache or the least recently used (LRU) command is issued to purge the overloaded cache line.

When a subsequent sub-line write makes a request for ownership, the data line in 'M-prime' state in 540 is moved to 'ME-prime' state in 545. In this pseudo-exclusive state, similar to the 'E-prime' state, the data line may move to 'C'-state in 530 as a result of either a snoop detecting a line conflict for exclusive ownership for the partial write or ordering requirements for a partial write not being met. If the exclusive ownership for the partial write is granted and the ordering requirements are met for a partial line, the data line changes back to 'M-prime' state in 540 to await further sub-line write commands. However, the data line in 'ME-prime' state in 545 may need to be written to memory. If the ordering requirements for a full line write are met, the partial lines are merged for a full line write. The line write to memory is performed and the write transaction is completed as the data line is promoted from 'ME-prime' state in 545 to 'M-state' in 535. Once the line is written to memory, the coherency engine no longer holds the state for the line, and is considered invalid 'I'-state in 510.

The intermediate MESI states, 'E-prime' in state 520, 'C'-state (conflict) in state 530, 'M-prime' in state 540, and 'ME-prime' (modified/exclusive) in state 545 are discussed in further detail in FIG. 6 and FIG. 7 below.

Figure 6:
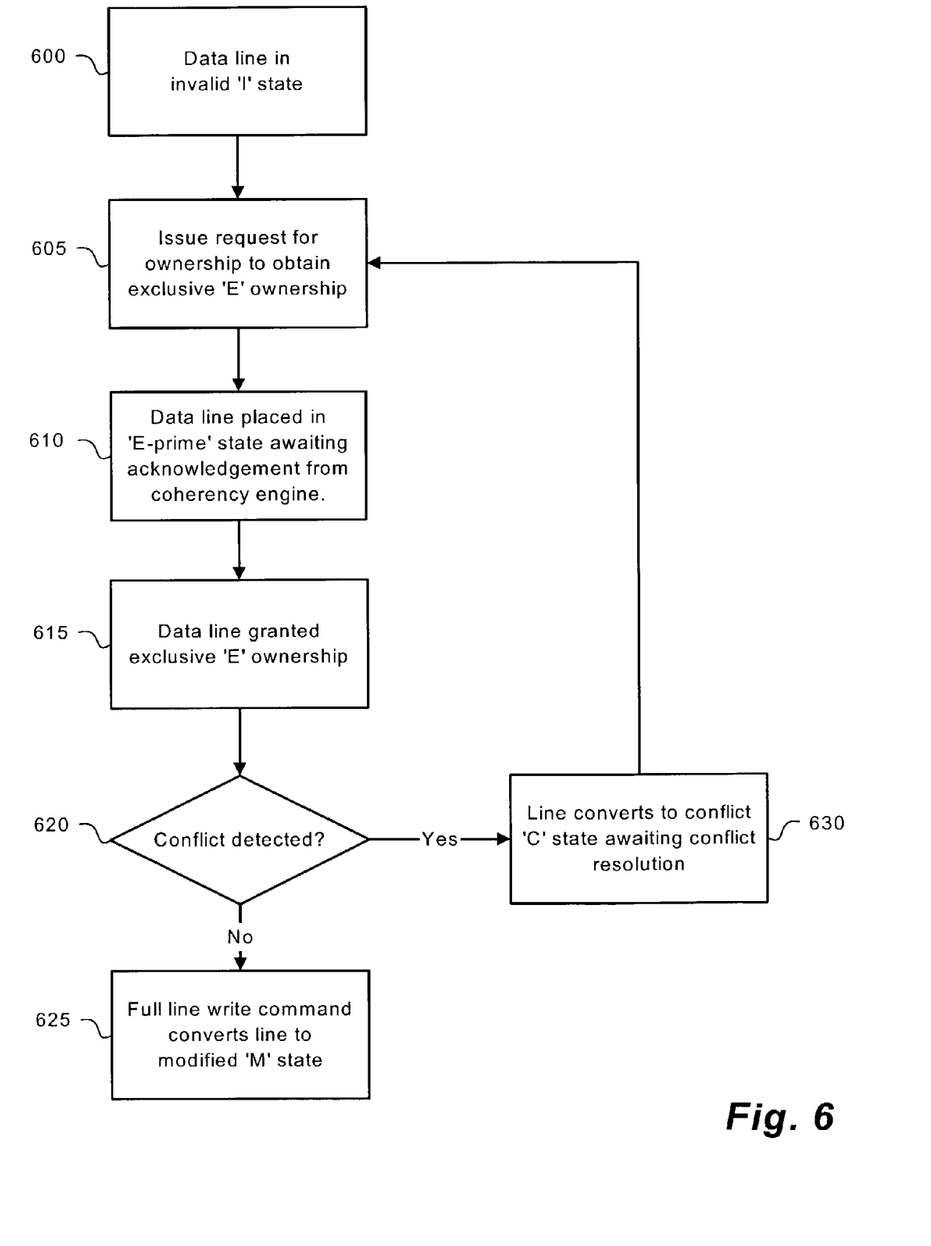
FIG. 6 is a flow diagram showing a conflict in the request for ownership employing an embodiment of the present invention.

Referring to FIG. 6, a flow diagram is shown to demonstrate resolving a request for ownership conflict utilizing the intermediate coherency protocol states employing an embodiment of the present invention. A data line is requested in invalid 'I'-state in block 600. Control passes to block 605, where a request for ownership is issued for exclusive 'E'-state. The data line is placed in 'E-prime' state awaiting acknowledgement from the coherency engine to promote the line to exclusive 'E'-state in block 610. Commonly, because of the potential latency due to the communication distances from the various caches arbitrated by the coherency engine, the line is placed in 'E-prime' state, awaiting line conflict check completion and communication from the coherency engine in block 610. Bandwidth is typically wasted with continuous requests by the line in exclusive state and NACKs (Not Acknowledged responses) from the coherency engine before exclusive state is granted. By applying intermediate MESI states within the coherency protocol, bandwidth utilization is maximized and latency is minimized. In block 615, the data line is granted 'E'-state ownership. Control passes to decision block 620. If a conflict is detected for exclusive access to the line (e.g. more than one cache requests exclusive 'E' ownership of the line for a write), the line changes to conflict 'C'-state in 630. Rather than return to 'I'-state and continuously request exclusive 'E' access for the line only to receive NACKs in response, the data line is placed in 'C'-state, awaiting acknowledgment from the coherency engine for exclusive access to the line. Again, the conflict 'C'-state promotes maximum bandwidth utilization by avoiding unnecessary and superfluous bandwidth usage. Further, latency is minimized by the coherency engine, which arbitrates the conflict and communicates exactly when the line can be promoted from 'C'-state back to exclusive 'E'-state. When the conflict is resolved, the line issues a request for exclusive 'E'-state again in block 605. This returns the data line to 'E-prime' state once again to await acknowledgment for exclusive access to the line.

If no ownership conflict exists for the data line, control passes to block 625, where a full line write commands is issued. A processor write occurs and the line is converted to modified 'M'-state.

Figure 7:
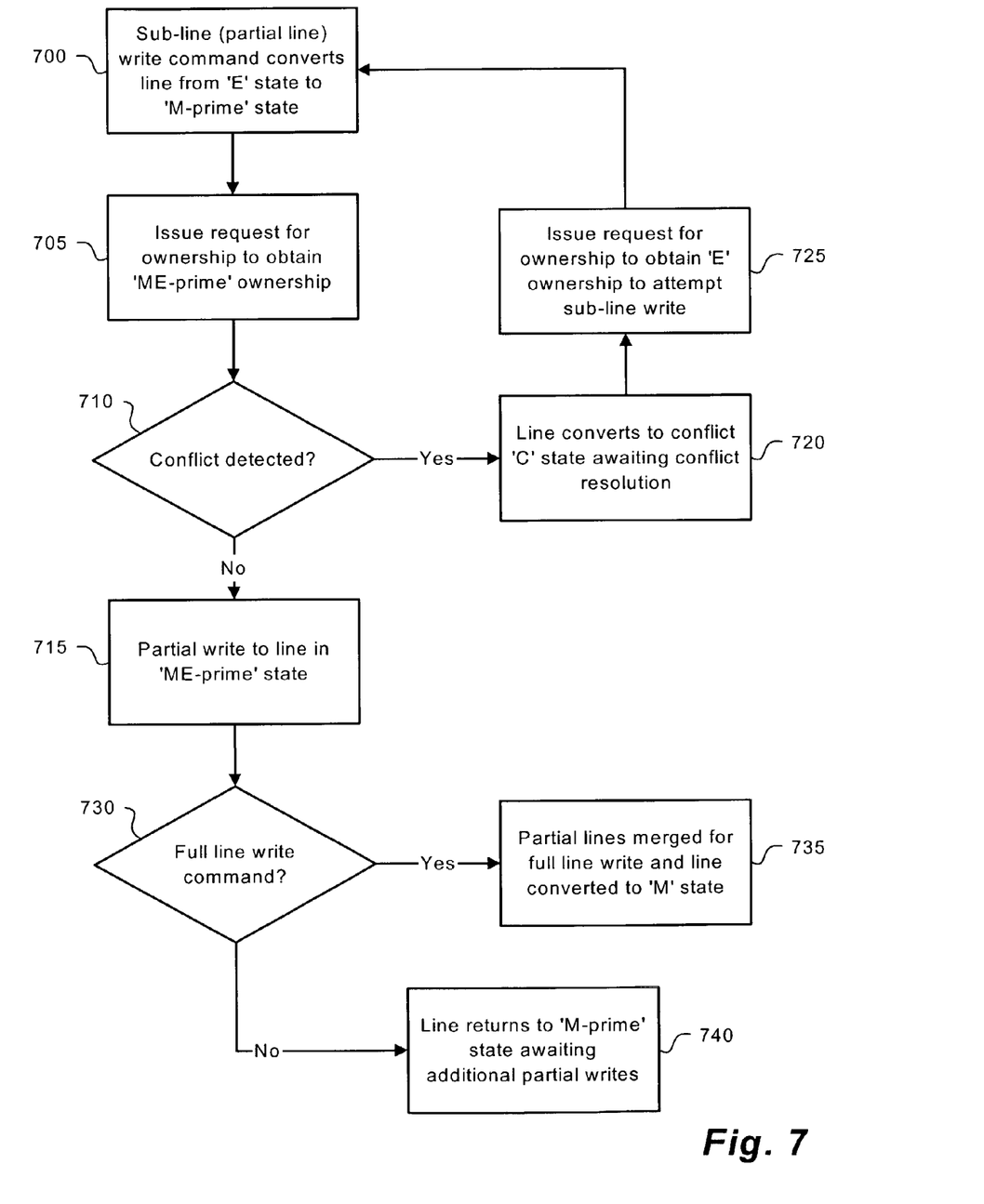
FIG. 7 is a flow diagram showing an inbound coherent write transaction for a partial line write employing an embodiment of the present invention.

Referring to FIG. 7, a flow diagram of an inbound coherent write transaction for a partial line write employing an embodiment of the present invention is shown. In block 700, a sub-line, or partial line, write command converts the data line from 'E'-state to 'M-prime' state. A request is issued for ownership to obtain 'ME-prime' ownership to for a partial line write in block 705. Control passes to decision block 710. If a conflict is detected for exclusive access for the partial write, the line changes to conflict 'C'-state in block 720, awaiting conflict resolution. As discussed above regarding 'C'-state and resolution of conflicts for exclusive 'E' ownership, the same conflict resolution process applies when a conflict for 'ME-prime' ownership occurs. The benefits of reduced latency and increased bandwidth utilization as discussed above for the conflict 'C'-state also apply in this example. When the conflict is resolved, in block 725, the line issues a request for exclusive 'E'-state again to attempt the sub-line write once more. This returns control back to block 700.

If no conflicts result from the request for 'ME-prime' ownership, the line is placed in 'ME-prime' state and the partial write occurs in block 715. Control then passes to decision block 730. If the system issues a full line write command, the partial line writes are merged into a full line write. The line is merged into a full line write to the processor and the line state converted to modified 'M-state' in block 735. If there is no full line write command, control passes to block 740 so the line returns to 'M-prime' state awaiting additional partial writes to the line. However, if a snoop detects a line conflict in the write cache or a least recently used (LRU) command is issued, the line is written as a full line write. The LRU command eliminates the least used cached entry if the number of partials writes outnumber the write capacity of the full line write. The line converts from 'M-prime' state to modified 'M'-state.

Figure 8:
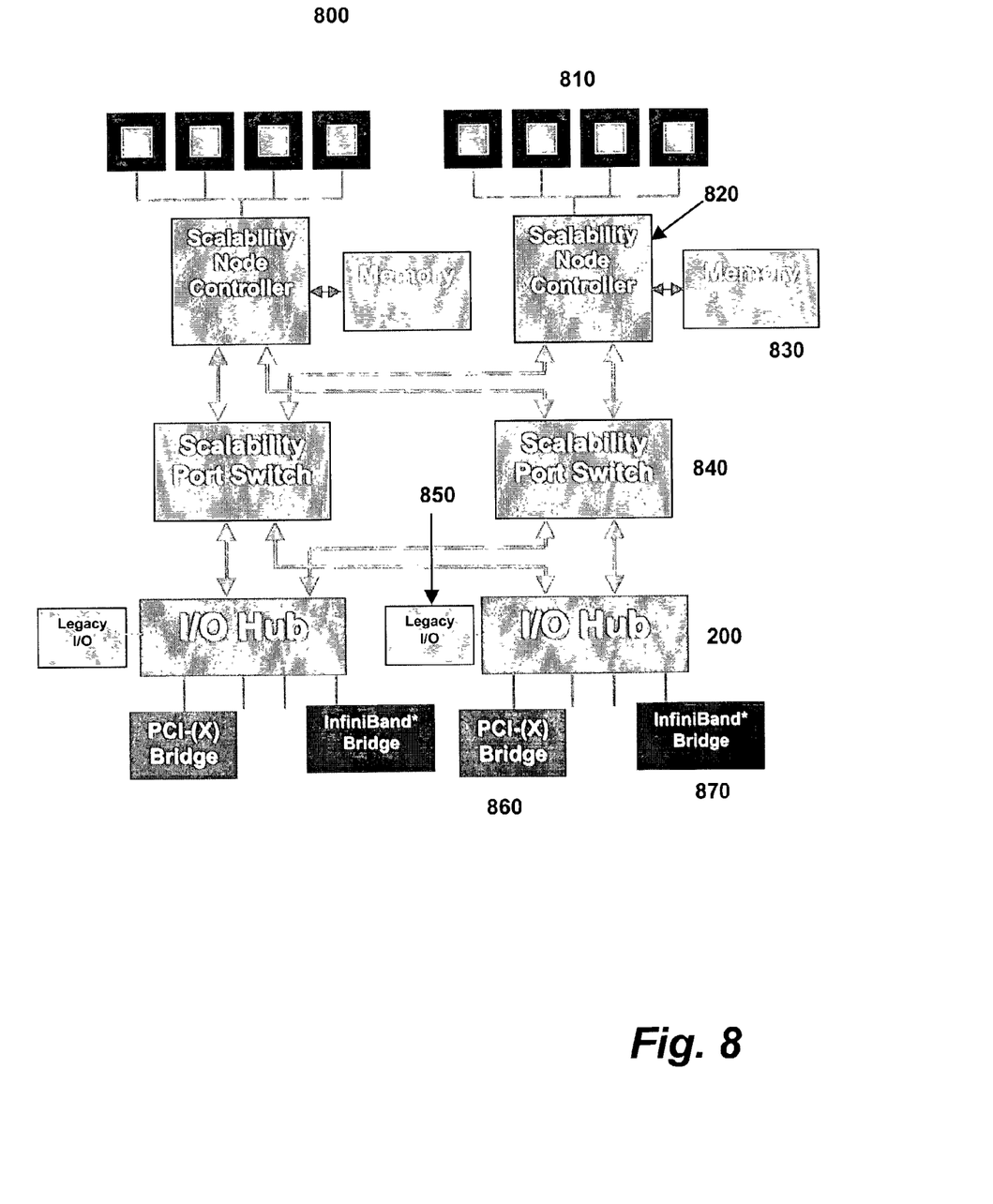
FIG. 8 is a block diagram showing an input/output system architecture according to an embodiment of the present invention.

Referring to FIG. 8, an input/output system architecture illustration according to an embodiment of the present invention is shown. The cache-coherent I/O device 200 includes a write cache 210, a coherency engine 205, and one or more read caches 215 and 220. A coherent host interface 230 is provided to connect with a coherent host, such as a front-side bus, an Intel Scalability Port, or a Scalability Node Controller. The Scalability Port, for example, is a cache-coherent interface optimized for scalable multi-node systems that maintain coherency between all processors and their caches. According to one embodiment of the present invention, the coherent host interface 230 may connect with two coherent hosts, such as two Scalability Ports. At least one input/output interface 235 and 240 is provided to connect with the I/O components or devices 245 and 250. The I/O interface 235 and 240 typically do not directly connect to the I/O components or devices 245 and 250, though. An intermediary device, such as a hub-link or input/output bridge, like an Intel P64H2 Hub Interface-to-PCI Bridge, or a VXB InfiniBand ("InfiniBand Architecture Specification", version 1.0, Jun. 19, 2001, from the InfiniBand Trade Association) Bridge, is generally connected to the I/O interface 235 and 240, to which the I/O components or devices 245 and 250 connects. Each P64H2 bridge, for example, has two PCI-X ("PCI-X Specification", Revision 1.0a, Aug. 29, 2000, from the PCI-SIG) segments to which I/O components or devices 245 and 250 may connect. PCI-X is a high-performance extension to the PCI Local Bus having increased bandwidth and bus performance.

As discussed above, the cache-coherent I/O device 200 may include input/output interfaces 235 and 240 that are coupled to an intermediary device, such as a hub-link or input/output bridge, like a PCI-X bridge 860 or an InfiniBand bridge 870. The I/O components or devices 245 and 250 then connect to the intermediary devices 860 and 870. Cache-coherent I/O device 200 may also include an I/O interface that connects to a legacy input/output bridge 850 to handle connections with legacy I/O components or devices.

The cache-coherent I/O device 200 is adapted to connect to a coherent host, such as a Scalability Port 840, which is a cache-coherent interface optimized for scalable multi-node systems that maintain coherency between all processors and their caches. The Scalability Port 840 in turn may connect to at least one Scalability Node Controller 820, which controls the interface between the processors 810, the main memory 830 (e.g., DRAM), and the Scalability Port 840.

Accordingly, the cache-coherent I/O device 200 utilized in the I/O system architecture 800 of the present invention provides for optimized I/O applications in, for example, a chipset for a multi-processor computer system. The cache-coherent I/O device 200 minimizes latency and provides quick responses to requests. Implementation scalability and performance are therefore optimized with the cache-coherent I/O device 200 of the present invention.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. In a cache-coherent device including a coherency engine, an integrated cache, divided into a plurality of distributed caches, and a plurality of client ports, a method for processing a transaction, comprising:

receiving a transaction request for a data element at one of said plurality of client ports, said transaction request includes an address;

determining, using a coherency engine, whether said address is present in one of the plurality of distributed caches, each of said distributed caches assigned to one of said plurality of client ports; and monitoring whether said data element is requested in exclusive state and whether said data element can be granted exclusive state transmitting said data element for said read transaction request from said one of said plurality of distributed caches to one of said plurality of client ports prefetching one or more cache lines ahead of said read transaction request; and updating a coherency state information in said plurality of distributed caches wherein said transaction request is a read transaction request wherein a coherency state is stored as a set of status bits in said plurality of distributed caches and utilized by a cache coherency protocol, wherein said set of status bits for each data element in the cache include: a modified bit, an exclusive bit, a shared bit, an invalid bit, an exclusive prime bit, a modified prime bit, a modified-exclusive prime bit, a conflict bit, and a shared conflict bit.

2. The method of claim 1 wherein said transaction request is a write transaction request.

3. The method of claim 2 further comprising:
modifying coherency state information for a cache line in said one of said plurality of distributed caches;
updating coherency state information in others of said plurality of distributed caches by said coherency engine; and
transmitting data for said write transaction request from said one of said plurality of distributed caches to memory.

4. The method of claim 3 further comprising:
modifying coherency state information of said write transaction request in the order received; and
pipelining multiple write requests.

5. The method of claim 4 wherein a coherency state is stored as a set of status bits in said plurality of distributed caches and utilized by a cache coherency protocol, wherein said set of status bits for each data element in the cache include: a modified bit, an exclusive bit, a shared bit, an invalid bit, an exclusive prime bit, a modified prime bit, a modified-exclusive prime bit, a conflict bit, and a shared conflict bit.

6. A cache-coherent device comprising:
an integrated cache, divided into a plurality of distributed caches, to store data from or to be stored in a system memory, wherein the plurality of distributed caches is accessed by a processor;
a plurality of client ports, each to be coupled to one of a plurality of port components, and each to be coupled to one or more of the plurality of distributed caches wherein each of the plurality of distributed caches is assigned to one of said plurality of port components;
a coherency engine, coupled to said plurality of distributed caches, to arbitrate requests from the processor to the plurality of distributed caches, wherein said coherency engine is to monitor whether a data element is requested in exclusive state and whether a data element can be granted exclusive state,
wherein said plurality of distributed caches is operable to generate a plurality of signals, including:
a first signal generated in response to a snoop for a data element that is requested in exclusive state;
a second signal generated in response to a snoop for a data element that is granted in exclusive state;
a third signal that is generated for a data element that cannot be granted exclusive state;
a fourth signal generated in response to a sub-line write command for a data element that is to be written as a partial line write;
a fifth signal generated in response to a snoop for a data element that is requested in exclusive state for a partial line write; and
a sixth signal that is generated for a data element that cannot be granted modified-exclusive prime state,
wherein said plurality of distributed caches include transaction buffers that operate on a coherency logic protocol, and
further wherein said plurality of distributed caches store a set of status bits for each data element in the cache, including a modified bit, an exclusive bit, a shared bit, an invalid bit, an exclusive prime bit, a modified prime bit, a modified-exclusive prime bit, a conflict bit, and a shared-conflict bit.

7. The device of claim 6 wherein said plurality of port components include processor port components.

8. The device of claim 6 wherein said plurality of port components include input/output components.

9. The device of claim 6 wherein:
said first signal is an exclusive prime signal.

10. The device of claim 6 wherein:
said second signal is an exclusive signal.

11. The device of claim 6 wherein:
said third signal is a conflict signal.

12. The device of claim 6 wherein:
said fourth signal is a modified prime signal.

13. The device of claim 6 wherein:
said fifth signal is a modified-exclusive prime signal.

14. The device of claim 6 wherein:
said sixth signal is a conflict signal.

15. A processing system comprising:
a processor;
a plurality of port components; and
a cache-coherent device coupled to said processor and including a plurality of client ports, each coupled to one of said plurality of port components, said cache-coherent device further including an integrated cache, divided into a plurality of distributed caches, each of said plurality of distributed caches coupled to one of said plurality of client ports and assigned to one of said plurality of port components, a coherency engine coupled to said plurality of distributed caches to arbitrate requests from the processor to the plurality of distributed caches, wherein said coherency engine is to monitor whether a data element is requested in exclusive state and whether a data element can be granted exclusive state and arbitrate requests to the plurality of distributed caches wherein said plurality of distributed caches is operable to generate a plurality of signals, including:
a first signal generated in response to a snoop for a data element that is requested in exclusive state;
a second signal generated in response to a snoop for a data element that is granted in exclusive state;
a third signal that is generated for a data element that cannot be granted exclusive state;
a fourth signal generated in response to a sub-line write command for a data element that is to be written as a partial line write;

a fifth signal generated in response to a snoop for a data element that is requested in exclusive state for a partial line write; and a sixth signal that is generated for a data element that cannot be granted modified-exclusive prime state;

wherein said plurality of port components include input/output components, wherein said plurality of distributed caches include transaction buffers that operate on a coherency logic protocol, and wherein said plurality of distributed caches store a set of status bits for each data element in the cache, including a modified bit, an exclusive bit, a shared bit, an invalid bit, an exclusive prime bit, a modified prime bit, a modified-exclusive prime bit, a conflict bit, and a shared-conflict bit.

16. A set of instructions residing in a storage medium, said set of instructions capable of being executed by a processor to implement a method for processing a transaction, comprising:

receiving a transaction request for a data element at one of said plurality of client ports, said transaction request includes an address;

determining, using a coherency engine, whether said address is present in one of a plurality of distributed caches, each of said distributed caches assigned to one of said plurality of client ports; and monitoring whether said data element is requested in exclusive state and whether said data element can be granted exclusive state wherein a coherency state is stored as a set of status bits in said plurality of distributed caches and utilized by a cache coherency protocol, wherein said set of status bits for each data element in the cache include: a modified bit, an exclusive bit, a shared bit, an invalid bit, an exclusive prime bit, a modified prime bit, a modified-exclusive prime bit, a conflict bit, and a shared conflict bit.

* * * * *